United States Patent [19]

Rose

[11] Patent Number: 4,570,957

[45] Date of Patent: Feb. 18, 1986

[54] MECHANIC'S CREEPER

[76] Inventor: James W. Rose, 127 Shoshone, Nampa, Id. 83651

[21] Appl. No.: 679,808

[22] Filed: Dec. 10, 1984

[51] Int. Cl.⁴ .............................................. B62B 11/00

[52] U.S. Cl. ...................................... 280/32.6; 188/5; 280/87.04 A

[58] Field of Search ............. 280/32.6, 87.04 A, 11.2, 280/43.24; 188/5, 6, 8

[56] References Cited

U.S. PATENT DOCUMENTS

| | | | |
|---|---|---|---|
| 1,831,408 | 11/1931 | Cremer | 280/32.6 |
| 2,210,585 | 8/1940 | Hulbert | 280/32.6 |
| 2,595,782 | 5/1952 | Griffin | 280/32.6 |
| 2,650,372 | 9/1953 | Lowe | 280/32.6 |
| 2,652,576 | 9/1953 | Clark | 280/32.6 |
| 2,692,636 | 10/1954 | Morrison | 280/32.6 |
| 2,703,717 | 3/1955 | Miller | 280/32.6 |
| 3,361,437 | 1/1968 | Loftis | 280/32.6 |
| 3,984,116 | 10/1976 | Bowers | 280/32.6 |
| 4,244,594 | 1/1981 | Hines | 280/32.6 |

*Primary Examiner*—Joseph F. Peters, Jr.
*Assistant Examiner*—Donn McGiehan
*Attorney, Agent, or Firm*—Klarquist, Sparkman, Campbell, Leigh & Whinston

[57] ABSTRACT

The invention includes a mechanic's creeper having a bowed frame and a method for constructing the frame. The frame comprises a pair of parallel longitudinal rails of rectangular metal tubing bowed to form an arch for increased strength against vertical loads resting on the creeper. A plurality of metal cross members are welded to the underside of the longitudinal rails to form the frame. A creeper bed formed by wood or metal sheet, a headrest and castors for movement are attached to the frame. To construct the creeper frame, the longitudinal rails are fixed parallel to each other and the cross members welded in a predetermined sequential order across the underside of the frame. The sequential welding causes the metal of the underside of the longitudinal rails to expand as it is heated and then to contract as it cools to a length less than its original length to bow the rails lengthwise.

8 Claims, 5 Drawing Figures

FIG.5
FIG.1
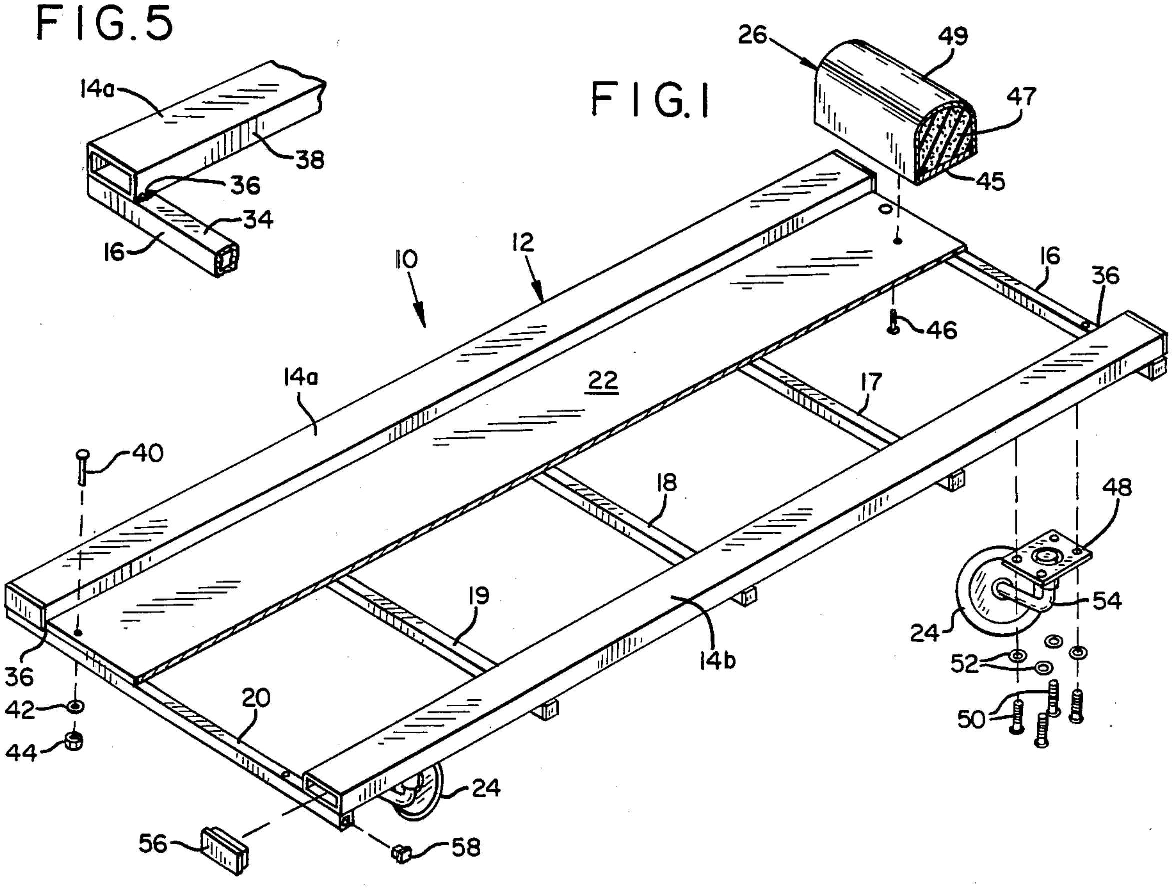
FIG.4
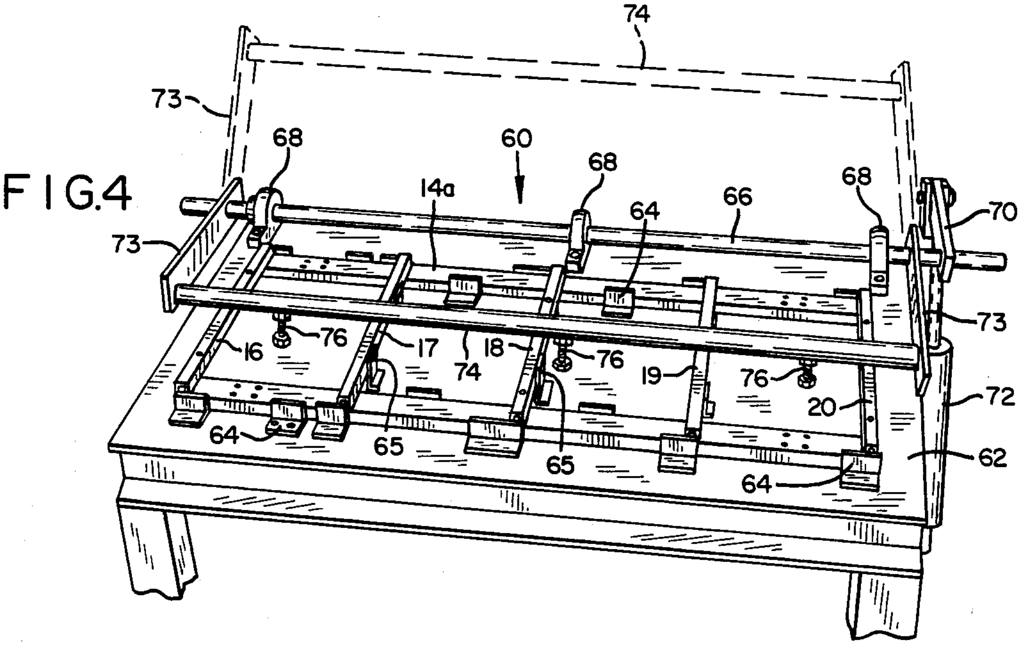

MECHANIC'S CREEPER

BACKGROUND OF THE INVENTION

This invention relates generally to a mechanic's creeper and more particularly to the frame of a creeper.

Creepers are designed primarily to allow a mechanic to lie on his back and roll under a car wherever necessary. A frame to support the mechanic is constructed of readily available wood or metal tubing. For example, U.S. Pat. No. 2,210,585 to Hulbert discloses a creeper with flat wooden frame members. U.S. Pat. No. 2,595,783 to Griffin shows frame members constructed of straight metal reinforced tubing. To this frame a wood or metal sheet is secured to form the creeper bed.

These creepers and others available wear out rather quickly because their frames are of limited strength. They are suitable at most for supporting the weight of a mechanic, but they-cannot support much heavier items such as an engine or transmission that it may be desirous to move. For such a purpose, a separate dolly is required.

An obvious way of increasing the strength of the creeper frame would be to construct the frame of higher strength material or to use more material in its construction. Both approaches, though, have drawbacks. Using higher strength material or merely more material may still not provide sufficient strength and yet would increase the relatively low cost of a creeper. The use of more material, furthermore, is limited by the size and maneuverability requirements of a creeper. The frame can be no more than several inches in height to mount on castors and yet be low enough to allow a mechanic on the creeper to move freely beneath a car chassis. The use of more castors to provide additional support, on the other hand, would interfere with the creeper's maneuverability.

Therefore, a need exists for an inexpensive mechanic's creeper of superior strength that can be used both as a conventional creeper and as a dolly for moving much heavier loads.

SUMMARY OF THE INVENTION

It is an object of the invention to provide a creeper frame of increased strength.

It is a further object of the invention to provide a creeper frame of increased strength without increasing its material costs.

It is yet another object of the invention to provide a creeper that can be used both as a creeper for a mechanic and as a dolly to transport much heavier weights.

In accordance with an illustrated embodiment, the present invention includes a stronger frame for a mechanic's creeper and a method for constructing the frame. The frame comprises a pair of parallel, similarly bowed longitudinal tubular rectangular metal rails providing a uniform arch convex on their top side to strengthen the rails for supporting a weight resting thereon. A plurality of cross members are welded to the underside of the longitudinal rails to orient the rails opposite each other in similar-based relation, thereby forming the frame.

The frame may be constructed by positioning each longitudinal rail in a fixed position and heating what will be the underside thereof to cause it first to expand and then to contract as it cools to a length less than its original length. This heating step is preferably effected by welding the cross members to the underside of the longitudinal rails in constructing the frame. Preferably, a cross member is first welded to adjacent ends of both longitudinal rails. Next, cross members are welded consecutively across the underside of the rails toward the opposite rail ends. In one aspect of the invention, each weld is made for substantially the same duration so that the rails are heated uniformly from end to end. After the rails cool, the longitudinal rails will curve convexly on the top side thereof.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is an exploded perspective view of the mechanic's creeper;

FIG. 4 is a perspective view of the frame members positioned for welding; and FIG. 5 is a fragmentary perspective view of the frame showing the location of welding between members.

DETAILED DESCRIPTION

Figure 2:
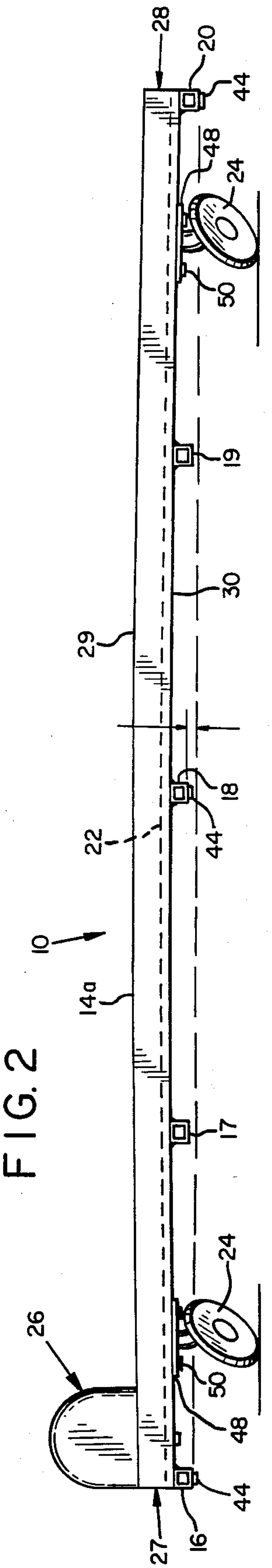
FIG. 2 is a side elevational view of the creeper frame taken along line 2—2 of FIG. 1.

Referring to FIG. 1, the creeper 10 of the invention includes a frame 12 formed by a pair of parallel similarly bowed longitudinal side rails 14*a*, 14*b* longitudinally convex on their top sides and concave on their underside to which are welded a series of cross members 16–20. The rails 14*a*, 14*b* and the cross members 16–20 are preferably formed of rectangular tubular steel. A metal or wooden sheet supported on the cross members 16–20 between the longitudinal rails forms the creeper bed 22. The creeper maneuvers on castors 24, one bolted to each corner of the underside of frame 12. A foam cushion headrest 26 is secured to one end of the top side of the bed 22.

The Creeper Frame

As best shown in FIG. 2, the side rails 14*a*, 14*b* are each upwardly arched from a first end 27 to a second end 28 with a convex top side 29 and a concave underside 30. The rails 14*a*, 14*b* are oriented opposite each other and fixed in parallel similarly bowed relation by the cross members 16–20 which extend between the rails and are welded to the underside 30 of each of the rails. Cross member 16 is welded to the undersides 30 of the longitudinal rails at their first ends 27. Second, third and fourth interior cross members 17, 18, 19 are welded at uniformly spaced locations along the underside of the longitudinal rails, and a fifth cross member 20 is welded to the second ends 28. Referring to FIG. 5, each of the cross members 16 and 20 is also spot welded on its top side 34 at the junctions 36 of the cross member with the inside 38 of each longitudinal rail. Cross members 16–20 thus provide the frame with lateral rigidity.

To form the bed 22 of the creeper, the sheet of plywood or metal is bolted to the top side 34 of each of several cross members between the rails by a pair of bolts 40, one bolt near each longitudinal rail 14*a*, 14*b*. As shown in FIG. 1, each bolt extends through the bed 22 and an aperture within the cross member and is secured by a lock washer 42 and nut 44. The bed 22 distributes the weight on the creeper over all the cross members 16–20. At the head of the bed, the headrest 26 is secured by screws 46 extending upward through the bed into the wood base 45 of the headrest. The headrest includes a cushiony material such as rubberized foam 47 enclosed within a vinyl cover 49.

The castors 24 are of conventional design and attached to the frame by brackets 48. Each bracket is secured to the undersides 30 of the rails near a corner of the frame by bolts 50 and washers 52. Each castor is journaled to a pivotable crank arm 54 of a bracket 48 to permit the desired swiveling and universal movement of the creeper as well as linear movement.

At each end of the longitudinal rails 14*a*, 14*b*, protective plugs 56 are placed to cover the sharp metal edges of the rails. The cross members 16–20 have similar protective plugs 58 on each end.

The superior strength of the frame derives from the bowed shape of the longitudinal rails. Together these rails form continuous arches that exert upward reaction forces to a downward-bearing load placed upon the frame, reaction forces that are substantially absent from a conventional flat framed. The strengthened creeper thus does not wear out as quickly from normal use and can also be used as a dolly for carrying heavy loads such as transmissions and engines. In tests of the frame's strength, the bowed frame has successfully supported up to 1,500 pounds. Additionally, the bowed configuration seems to lessen a mechanic's back strain that develops from lying on a creeper bed. The convex bow in the bed 22 matches the natural curve of the spine to support the back more completely.

Method of Frame Construction

In accordance with the invention, the bow in the longitudinal rails 14*a*, 14*b* is developed by the welding of the cross members 16–20 to rails 14*a*, 14*b*. The heating of the metal from the welding causes the underside 30 of each rail to expand as it is heated and to contract as it cools to a length less than its original length. Other heating means than welding may be used, but the welding provides better lateral frame strength than other fastening means. The welding is preferably done with a wire feed welder.

To begin, the longitudinal rails 14*a*, 14*b* are fixed firmly in opposed parallel relationship in a jig 60, shown in FIG. 4. The rails are inverted so that their undersides are the uppermost surface of the rails. The jig includes a flat surfaced bed 62 on which a series of guides 64 are attached. The rails 14*a*, 14*b* are placed within these guides to hold the rails in their parallel relationship. Thereafter, the cross members 16–20 are placed in position with the ends of the member overlapping the uppermost surface of the rails 14*a*, 14*b*. Cross members 16 and 20 are placed adjacent each opposing end of the rails, respectively and intermediate members 17–19 are uniformly spaced therebetween. Guides 65 are attached to the bed 62 to align the members accurately.

Means are provided to clamp the rails 14*a*, 14*b* against the bed 22 during welding. Such means includes a shaft 66 journaled in a series of blocks 68 above the bed 62 and parallel to the rails 14*a*, 14*b*. On one end of the shaft 66, a fixed arm 70 extends outwardly and is connected to a piston 72 (powered by conventional means) such that the piston movement raises and lowers the arm 70 and thus partially rotates the shaft 66. Also securely fixed to the shaft 66 is a pair of arms 73 that extend over the bed 62. The arms 73 support a press bar 74 that can be brought to bear on the midsection of the cross members 16–20 as they rest across the rails 14*a*, 14*b* to hold the rails firmly against the bed 62 during welding. The bar 74 is actuated by the action of the piston rotating the shaft 66. To avoid bowing the members 16–20 during welding, stops 76 on the bed 62 engage the bar 74 for limiting its downward movement.

Figure 3:
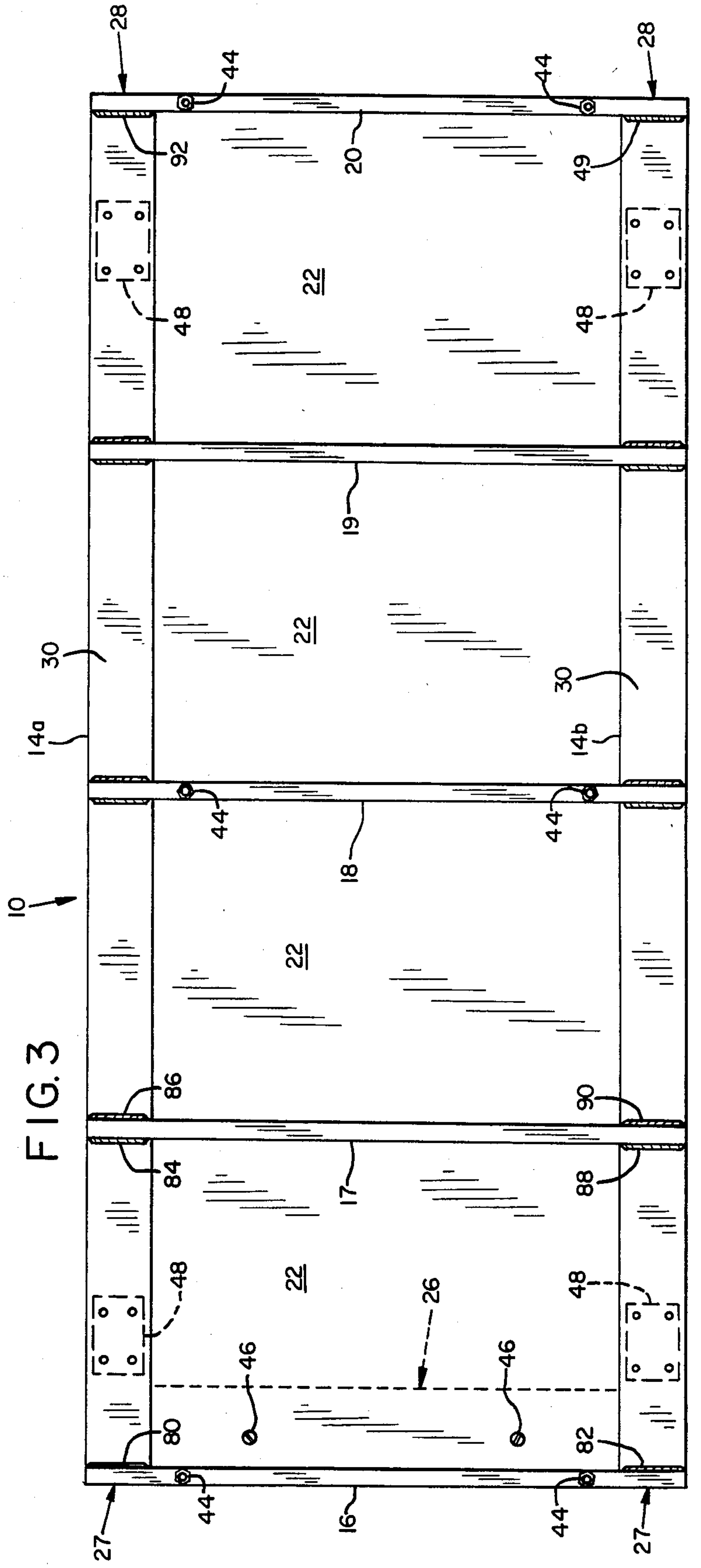
FIG. 3 is a bottom plan view of the creeper frame showing certain welding locations.

Welding is commenced after assembly of the side rails and cross members into the frame in the jig 60 and clamping of the assembled frame to the bed 62. Starting with the first cross member 16, the welds are made in a specific order. Referring to FIG. 3, a weld 80 is first made between the overlapping end of the member 16 and the surface of rail 14*a* at its first end along the inside edge of the cross member. The member 16 is next welded to the surface of the corresponding first end of the other rail 14*b* by a similar weld 82 opposite the weld 80. Each application of heat is preferably of substantially the same limited duration and at the same temperature so as to have a similar heating effect on the longitudinal rails.

The members 17, 18, 19 are then welded in sequence, each first to the rail 14*a* and next to the opposite rail 14*b*. The remaining members 17, 18, 19 are, however, welded along each side of its overlapping ends to the adjacent side rail 14*a* or 14*b*. Thus, following securement of cross member 16 to the side rails 14*a* and 14*b*, cross member 17 is first welded to the side rail 14*a* at each side of member 17 as indicated at 84 and 86. It is next similarly welded to rail 14*b* at 88 and 90. Thereafter, cross members 18 and 19 are similarly welded in place and finally the remaining cross member 20 is welded in place along its inner edge at 92 and 94. Each weld is preferably made for the same duration and succeeding welds at the same time interval to effect substantially even heating of the side rails from end-to-end.

By following this welding order, the longitudinal rails contract on their undersides uniformly as they cool to a length less than their original length to form smooth bows of equal magnitude when released from the clamp. Clamping prevents racking of the frame during welding. The rails assume a lengthwise bow upon release from their immobilization, with the concave side 30 towards the cross members. For final assembly, the rails and cross members are inverted so that the rails arch upwardly. In the embodiment shown, the welding sequence produced a curvature with the center of the underside of the rail about ⅛ inch higher than the ends.

Other orders of welding will not produce a bow of uniform curvature. For example, if welds to cross member 18 were made first, followed by the welds to cross member 17 and then the welds to member 19, these last welds to member 19 would occur a longer time after the welds to member 18 than the time between the welds to cross members 17 and 18. Consequently, the initial conditions before each weld to member 19 such as contraction and temperature of the surrounding metal would be different than the conditions before the welds to member 17. The resulting bow would have varying curvatures, a condition that would deprive the rail of much of its superior strength derived from its smooth arch.

In FIG. 5, final welds are made on the top of cross members 16 through 20 at junctions 36 on the inside of the longitudinal rails. These welds further laterally strengthen the frame.

Other frame designs are possible than the one illustrated and disclosed herein such as adding further cross members for more lateral support. Whatever the design, however, and in accordance with the method of manufacture described, the cross members preferably are welded to the longitudinal rails in the outlined sequential order to ensure a bow in each said rail of a uniform curvature along the underside of the frame.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. A frame for a mechanic's creeper comprising:

a pair of longitudinal rails, said rails being upwardly arched from end-to-end; and a plurality of cross members fastened to said longitudinal rails and extending between said rails for orienting the rails opposite each other in similar bowed relation.

2. A frame according to claim 1 wherein said rails and cross members are formed of tubular steel, and said cross members are welded to the bowed longitudinal rails.

3. A frame according to claim 2 wherein a cross member is attached to each end of said rails and interior cross members are attached at uniformly spaced intermediate locations.

4. A method of forming a frame for a mechanic's creeper comprising the steps of:

providing a pair of longitudinal rectangular tubular metal rails, each rail having an underside;

heating the underside of each rail for a limited duration to cause the rail to expand on the underside as it is heated and thereafter permitting each rail to cool whereby said underside will contract to a length less than its original length, causing said rail to bow;

providing a plurality of cross members; and fastening the cross members to said longitudinal rails to form the frame.

5. A method of forming a frame for a mechanic's creeper comprising the steps of:

providing a pair of rectangular tubular longitudinal metal rails having first and second ends and a plurality of tubular metal cross members;

placing the rails in opposed parallel relation;

placing a first cross member across a surface of the first ends of said rails;

welding the first cross member to the surface of one rail and then the other; and placing the remaining cross members across said surface of said rails and welding the remaining cross members to the surface of one rail and then the other in consecutive order along the rails to the second ends of said rails, whereby the heat of said welding causes said surface of each rail to lengthen as it is heated and then to contract as it cools to a length less than its original length, thereby to form a bow.

6. A method of forming a frame for a mechanic's creeper comprising the steps of:

providing a pair of rectangular tubular longitudinal metal rails having first and second ends and a plurality of tubular metal cross members;

placing the rails in opposed parallel relation and fixing their position so as to immobilize each;

placing the cross members across a surface of said rails with the ends of said members overlapping said rails and with said members spaced uniformly apart and with a cross member adjacent each end of said rails; and welding said cross members to said surface of said rails, whereby the heat of said welding causes said surface of each rail to lengthen as it is heateo and then to contract as it cools to a length less than its original length, so that said rails upon release of said immobilization assume a lengthwise bow, with the concave side towards said cross members, inverting said rails and cross members so that said rails arch upwardly.

7. A method according to claim 6 wherein the steps of welding the cross members include the following sequential steps:

welding a first cross member to the first end of one rail;

welding the first cross member to the corresponding first end of the other rail; and sequentially welding the remaining cross members to one rail and then the other in consecutive order along the rails to the second end of said rails to form a bowed frame of uniform curvature.

8. A method according to claim 7 wherein each welding of a cross member to one rail is substantially the same time interval apart.

* * * * *